Jan. 7, 1941. H. J. WADDELL 2,228,188

STOP VALVE

Filed Feb. 17, 1939

Inventor
Homer J. Waddell

W. S. McDowell

By

Attorney

Patented Jan. 7, 1941

2,228,188

UNITED STATES PATENT OFFICE 2,228,188

STOP VALVE

Homer J. Waddell, Baltimore, Ohio

Application February 17, 1939, Serial No. 256,984

2 Claims. (Cl. 251—93)

This invention relates to stop valves of the type generally employed in the oil and gas industry. These valves, commonly known as plug valves, have a body adapted to be connected in a pipe line and a tapered plug for controlling the flow of fluid through passages in the body and said line. Not infrequently, the plugs get stuck fast in the body and it becomes impossible to turn the plug without the use of a large wrench and consequent danger of injury to the valve. In addition to this, another objection arises in that through the presence of foreign matter, the valve seats become scored and fluid seepage through the valve results.

The main object of this invention resides in the provision of a valve which will avoid the objections above referred to, being always easy to turn on or off and having means to prevent the scoring of the seats to such an extent as to permit leakage.

Another object of the invention is the provision of means whereby the relatively movable portions of the valve will always be lubricated and the lubricant will be subjected to the pressure of the fluid in the line to force it into contact with the surfaces to be lubricated.

A still further object rests in so forming the valve that the fluid pressure in the line in which the valve is disposed, will operate to tend to loosen the valve plug in its socket so that turning movement may readily be imparted thereto.

It is an object also to form a valve body with a chamber for the reception of a large quantity of lubricant and to form recesses in the socket for the plug of the valve, which recesses communicate with the chamber to receive lubricant therefrom, the plug being provided with means to permit the fluid pressure in the passages of the valve to be applied to the chamber to force the lubricant into the recesses.

Additional objects will be apparent from the following description of the preferred form of valve which has been illustrated in detail in the accompanying drawing.

Figure 1:
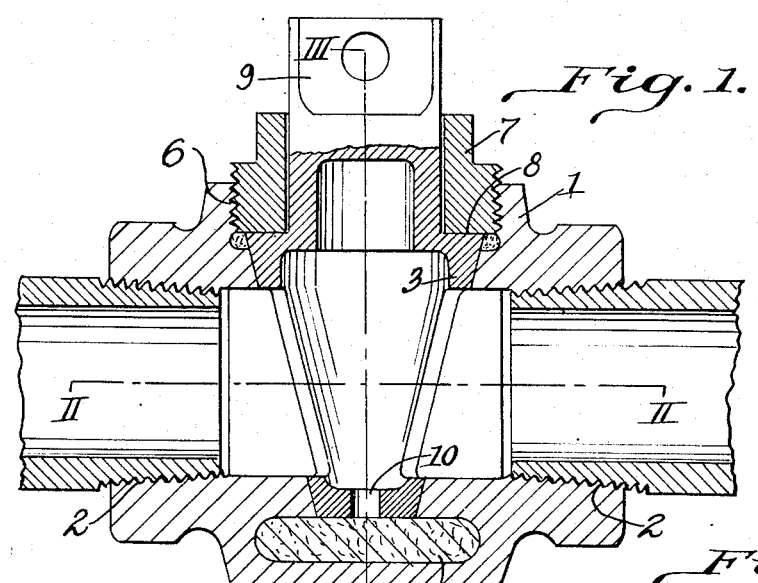
Fig. 1 is a vertical longitudinal sectional view taken through a valve formed in accordance with the present invention showing the same installed in a pipe line.

Referring more particularly to the drawing, the numeral 1 designates the valve casing. This casing is preferably formed from cast iron or similar material and is provided with a longitudinally extending passage, the ends of which are threaded as at 2 to provide for the connection of the casing in a pipe line. At its central portion, the body 1 is formed with a vertically extending tapered socket which intersects the longitudinal passage and receives a similarly tapered plug 3. The ports established by the connection of the longitudinal passage with the tapered socket are relatively narrow and are connected when the valve is in an open position by a transversely extending port formed in the plug 3. The inclination of the taper in the plug and socket is not as sharp as in the ordinary plugs, the lesser degree of inclination being provided to permit the valve to be readily removed from the socket.

At the lower end of the socket, an enlarged chamber 4 is formed for the reception of grease or similar lubricant. At the sides of the body, the chamber 4 extends upwardly and is connected with the tapered bore through slots 5 formed in the side wall of the bore. The immediate side wall of the bore is spaced from the sides of the body 1 to form the upward extensions of the chamber, the spacing serving to provide overhanging flanges at the sides of the slots 5 and to increase the volume of the lubricant receiving chamber.

Figure 2:
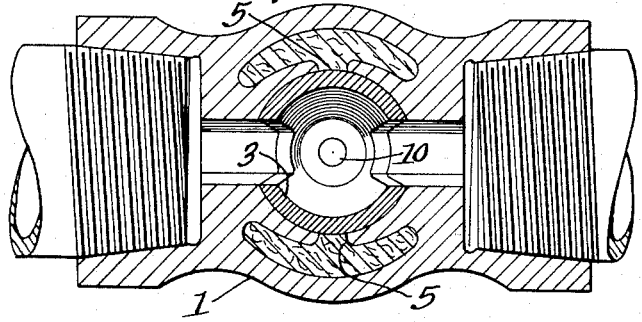
Fig. 2 is a horizontal sectional view taken on the plane indicated by the line II—II of Fig. 1.
Figure 3:
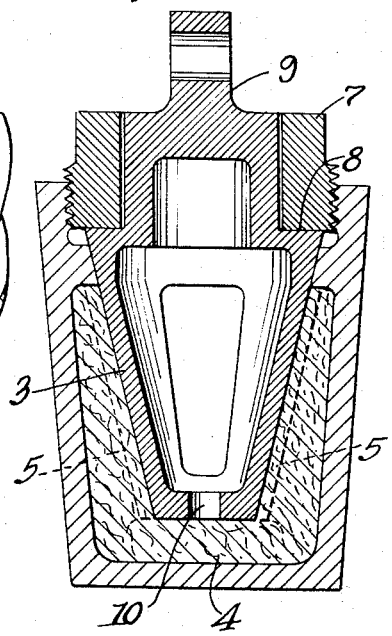
Fig. 3 is a vertical transverse sectional view taken on the plane indicated by the line III—III of Fig. 1.
Figure 4:
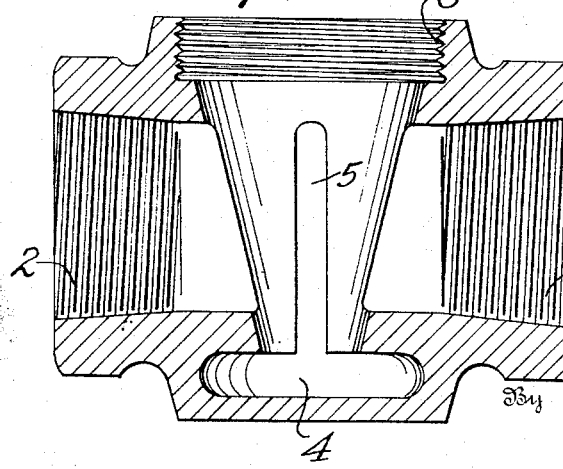
Fig. 4 is a vertical longitudinal sectional view taken through the valve casing, the valve plug and retaining ring being omitted from this view.

At its upper end, the central socket is provided with screw threads 6 to receive similar threads formed on a ring nut 7 employed in holding the plug 3 in the socket of the valve body. The under surface of the ring nut engages an annular shoulder 8 formed on the plug 3, the surface of the ring nut and the shoulder being finished to provide a seal at this point. The upper end of the plug 3 projects through the ring nut and is flattened as at 9 to accommodate a wrench or other tool used to turn the plug in the socket. As illustrated in Fig. 2, the distances from the edge of the inlet and outlet ports to the slots 5 are greater than the width of the transverse port in the plug in order that when the valve is turned from one position to another, the fluid will not be applied directly to the material in the slots 5.

The lower end of the plug 3 is formed to include a port 10 which establishes communication between the interior of the plug and the chamber 4. When the fluid pressure is introduced into the line in which the plug is situated, the pressure will be applied to the lubricant in the chamber 4 and this pressure will force the lubricant through the slots 5 into engagement with the side walls of the plug. When the plug is turned to close the fluid line, the pressure within the interior of the plug will prevent the flow of lubricant into the interior of the transverse passage. By reason of the pressure tending to force the lubricant into engagement with the side walls of the plug, these walls will always be lubricated and the valve readily operated. Since the diameter of the plug is considerably greater at the upper end than at the lower end, the pressure of the fluid in the line will tend to raise the plug out of the socket and assist in keeping the plug loosened so that turning movement may be imparted thereto.

While the invention has been illustrated in connection with a tapered valve, it is obvious that the lubricating features may be applied to valves of other types without departing from the spirit and scope of the invention as set forth in the following claims.

I claim:

1. In a stop valve, a body having a longitudinally extending passageway and a tapered socket extending at right angles thereto, a lubricant receiving chamber provided at the lower portion of said body, said chamber extending upwardly at the sides of said body, substantially vertical wall sections partially separating the upward extensions of said chamber from said socket, said wall sections each being joined with said body along one vertical edge, the other vertical edge being spaced from an adjacent portion of said body to provide a slot for establishing communication between the chamber extensions and said socket.

2. In a stop valve, a body having a longitudinally extending passageway and a tapered socket extending at right angles thereto, a lubricant receiving chamber provided at the lower portion of said body, said chamber extending upwardly at the sides of said body, substantially vertical wall sections partially separating the upward extensions of said chamber from said socket, said wall sections each being joined with said body along one vertical edge, the other vertical edge being spaced from an adjacent portion of said body to provide a slot for establishing communication between the chamber extensions and said socket, the lower horizontal edges of said wall sections being spaced from said body to increase the resiliency of the wall section.

HOMER J. WADDELL.